United States Patent
Swartling et al.

(10) Patent No.: US 9,243,708 B2
(45) Date of Patent: Jan. 26, 2016

(54) SYSTEM FOR CONTROL OF A GEARBOX

(75) Inventors: Fredrik Swartling, Södertälje (SE); Mikael Öun, Norsborg (SE)

(73) Assignee: SCANIA CV AB (SE)

( * ) Notice: Subject to any disclaimer, the term of this patent is extended or adjusted under 35 U.S.C. 154(b) by 754 days.

(21) Appl. No.: 13/392,159

(22) PCT Filed: Sep. 10, 2010

(86) PCT No.: PCT/SE2010/050963
§ 371 (c)(1),
(2), (4) Date: Feb. 24, 2012

(87) PCT Pub. No.: WO2011/031221
PCT Pub. Date: Mar. 17, 2011

(65) Prior Publication Data
US 2012/0150401 A1    Jun. 14, 2012

(30) Foreign Application Priority Data
Sep. 14, 2009   (SE) ...................................... 0950659

(51) Int. Cl.
*F16H 59/20* (2006.01)
*F16H 61/02* (2006.01)

(52) U.S. Cl.
CPC ........ *F16H 61/0213* (2013.01); *F16H 61/0204* (2013.01); *F16H 59/20* (2013.01); *Y10T 477/68* (2015.01)

(58) Field of Classification Search
CPC ....... Y10T 477/68; F16H 59/20; F16H 59/24; F16H 61/0204
See application file for complete search history.

(56) References Cited

U.S. PATENT DOCUMENTS

| 6,067,495 | A | 5/2000 | Fliearman et al. |
| 2003/0162633 | A1* | 8/2003 | Nakayama et al. ........... 477/120 |

FOREIGN PATENT DOCUMENTS

| DE | 103 21 519 | 12/2004 |
| DE | 10 2008 010 280 | 8/2009 |
| JP | 2009/085291 | 4/2009 |
| WO | WO 00/63591 | 10/2000 |

OTHER PUBLICATIONS

International Search Report dated Dec. 20, 2010 issued in corresponding international application No. PCT/SE2010/050963.

* cited by examiner

*Primary Examiner* — Derek D Knight
(74) *Attorney, Agent, or Firm* — Ostrolenk Faber LLP

(57) ABSTRACT

A system for control of a gearbox: At least one control unit controls the gearbox in a motor vehicle which comprises an engine connected to drive the gearbox. The system responds to receiving an indication by choosing for the gearbox a gear among various possible gears which causes the engine to reach a desired speed $\omega_{KD}$ in a shorter time than with any other gear from among the various possible gears. Also, a method, a motor vehicle, a computer program and a computer program product thereof for performing the method are disclosed.

17 Claims, 3 Drawing Sheets

US 9,243,708 B2

SYSTEM FOR CONTROL OF A GEARBOX

CROSS-REFERENCE TO RELATED APPLICATIONS

The present application is a 35 U.S.C. §§371 national phase conversion of PCT/SE2010/050963, filed Sep. 10, 2010, which claims priority of Swedish Application No. 0950659-3, filed Sep. 14, 2009, the contents of which are incorporated by reference herein. The PCT International Application was published in the English language.

TECHNICAL FIELD

The present invention relates to a system for control of a gearbox. The invention further relates to a system, a motor vehicle, a computer program and a computer program product thereof for control of the gearbox.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and conversely a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points.

Automated gear change systems usually comprise a so-called kickdown function whereby a downshift is imposed if such a function is activated. The object is to increase the speed of the engine 10 quickly so that more power is obtained from it, but such a downshift may result in the engine speed after the downshift turning out to be too high, thereby necessitating an upshift. This means that the number of unwanted gear changes increases, with consequent effects inter alia on ride comfort, fuel consumption and acceleration.

FIG. 3 depicts an example of an accelerator pedal 2 in a motor vehicle 1, which pedal may be pivoted about a spindle to control the acceleration applied/the engine torque, as illustrated by the dotted arrows in the diagram. The accelerator pedal comprises also a kickdown function which in this example is initiated if the accelerator pedal 2 is depressed to its bottom position so that a push-button or a sensor 3 is activated, whereupon the gear change system is given an indication that the kickdown function is to be initiated, e.g. by an electrical signal being sent to a control unit 110.

BRIEF DESCRIPTION OF THE INVENTION

An object of the present invention is to propose an alternative system for control of a gearbox. Another object of the invention is to propose a system for control of a gearbox which totally or partly solves the problems of the state of the art. A further object of the invention is to propose a kickdown function which reduces the number of unwanted gear changes.

According to an aspect of the invention, the above objects are achieved with a system for control of a gearbox which comprises at least one control unit adapted to controlling said gearbox in a motor vehicle which comprises an engine connected to, in order to drive, said gearbox, said system being adapted to responding to receiving an indication by choosing a gear to change to in said gearbox, which gear is among various possible gears for said gearbox and causes said engine to achieve a desired speed $\omega_{KD}$ in a shorter time than with any other gear from among said various possible gears.

Embodiments of the above system are referred to in the dependent claims pertaining to it. The invention also relates also to a motor vehicle comprising at least one system as above. According to another aspect of the invention, the abovementioned objects are achieved with a method for changing gear in a gearbox in a motor vehicle which comprises an engine connected to, in order to drive, said gearbox, said method being adapted to responding to receiving an indication by choosing a gear to change to in said gearbox, which gear is among various possible gears for said gearbox and causes said engine to achieve a desired speed $\omega_{KD}$ in a shorter time than with any other gear from among said various possible gears.

The invention relates also to a computer program comprising program code which, when the program code is executed in a computer, causes the computer to effect the above method. The invention relates also to a computer program product belonging to the computer program.

The method according to the invention may also be modified according to the various embodiments of the above system.

An advantage of the invention is that activation of kickdown function renders the engine's maximum power available in the shortest possible time. Another advantage is that unwanted gear changes are reduced when the kickdown function is used.

Further advantages and applications of a device and a system according to the invention are indicated by the detailed description set out below.

BRIEF DESCRIPTION OF THE DRAWINGS

In the detailed description of the present invention set out below, embodiments of the invention are described with reference to the attached drawings, in which.

DETAILED DESCRIPTION OF THE INVENTION

Figure 1:
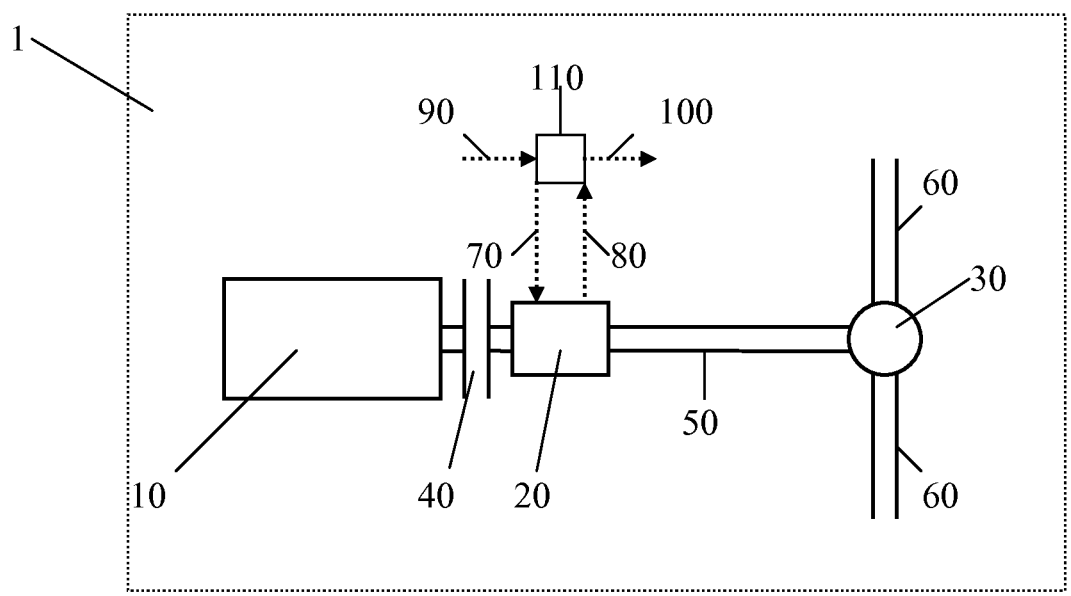
FIG. 1 depicts schematically part of a power train for a motor vehicle.
Figure 2:
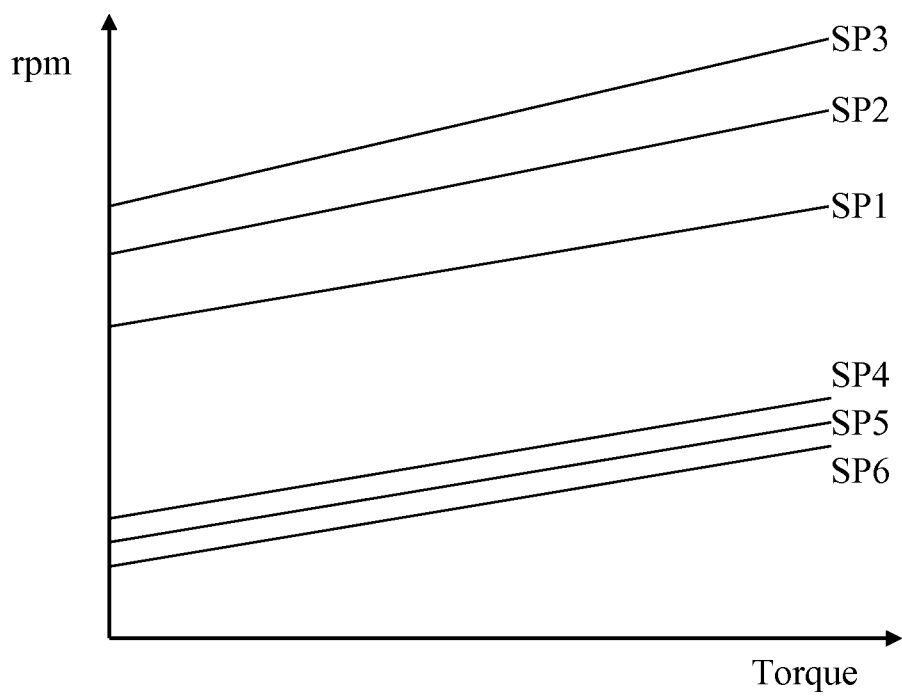
FIG. 2 is a graph of downshift and upshift lines.

The present invention relates to a system for control of a gearbox 20 in a motor vehicle 1, e.g. a truck or bus. The gearbox 20 is preferably of the kind which forms part of an automated gear change system controlled by a control unit 110, e.g. an ECU. In such a system, gear changes are effected automatically by the control unit 110 but it is also usual for the driver to be able to execute manual gear changes in such a system, what is known as manual gear change in automatic state (automatic mode). The gearbox 20 also has a plurality of gears, e.g. twelve forward gears and one or more reverse gears are usual in modern trucks.

To wholly or partly eliminate the disadvantages of kickdown functions according to the state of the art, a system is proposed which comprises a control unit 110 for control of a gearbox 20 whereby a gear is chosen for the gearbox 20 from among various possible gears when a kickdown function is initiated. The criterion for choice of gear is that the gear chosen for the gearbox 20 is that by which the engine 10 reaches a desired engine speed $\omega_{KD}$ in a shorter time than with any other gear from among the various possible gears.

The various possible gears according to an embodiment of the invention are the current gear in which the gearbox is operating, or a lower gear. The reason is that the same or a higher engine speed is always desired when a kickdown function is activated. In the case for example of a vehicle 1 which has twelve forward gears and is currently running in gear 8, the various possible gears according to this embodiment will be gears 1-8, so the number of gear steps may range between 0 and 7 downward steps, which means that zero gear change is also a possible alternative (i.e. staying in the same gear).

The desired engine speed $\omega_{KD}$ represents a desired speed for the engine 10. In this context it should be noted that the desired engine speed $\omega_{KD}$ is within a speed range which comprises the maximum power speed of the engine 10, i.e. the speed at which the power of the engine 10 is greatest. The reason is that the object of activating a kickdown function is to have as much power as possible quickly. The desired speed $\omega_{KD}$ according to an embodiment of the invention is therefore within a range defined as the maximum power speed $+/-\Delta\omega_{KD}$ of the engine 10, where $\Delta\omega$ is an engine speed in rpm. The order of magnitude of $\Delta\omega$ is preferably 100-300 rpm, but there is no need for the range defined as maximum power speed $+/-\Delta\omega$ to be symmetrical about the maximum power speed of the engine 10. What is usually desired is an engine speed $\omega_{KD}$ is just below the maximum power speed of the engine 10.

Figure 4:
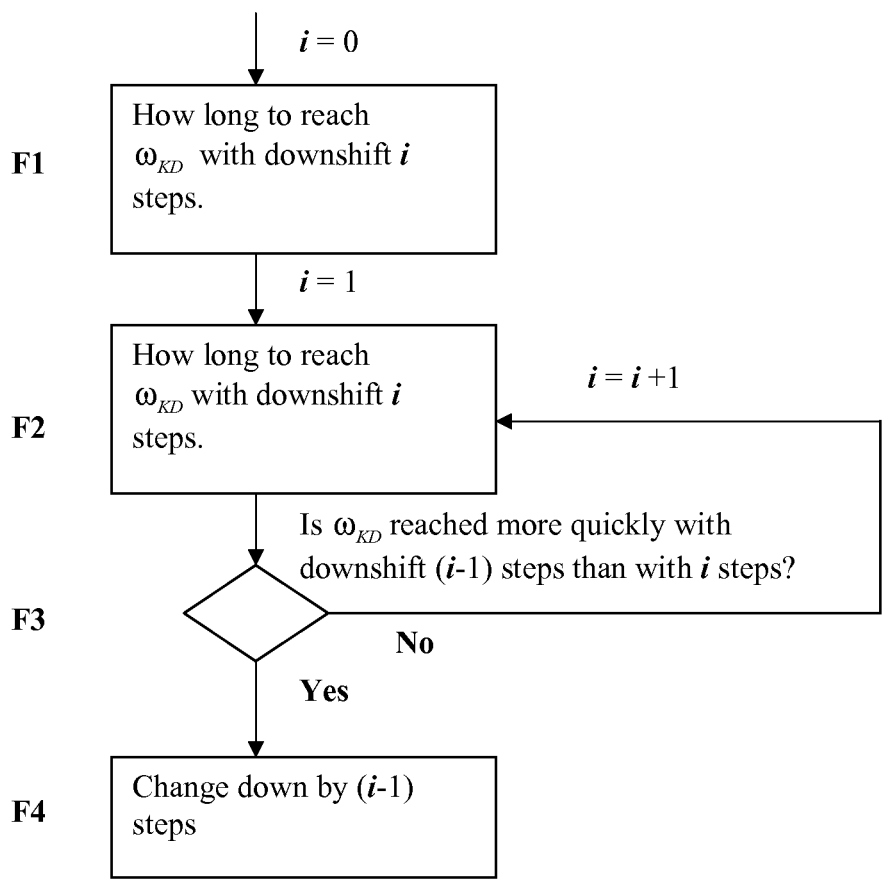
FIG. 4 is a flowchart of an embodiment of the invention.

With reference to the flowchart in FIG. 4, box F1 calculates how much time is taken to accelerate to maximum power speed $\omega_{KD}$ downshift, i.e. i=0, where i represents a number of downward steps from current gear when the kickdown function is initiated. This is followed by calculating in box F2 how much time is taken to reach maximum power speed $\omega_{KD}$ one downward step, i=1. These two times are then compared. If the time to reach maximum power speed $\omega_{KD}$ is shorter with i=0 than with i=1, the gear change system chooses not to effect any gear change. Otherwise, box F3 calculates the time taken to reach maximum power speed $\omega_{KD}$ with i downward steps and compares it with the time taken to reach maximum power speed $\omega_{KD}$ with i-1 downward steps. This process is repeated until a downward step i which takes longer than the previous one, i.e. i-1, is arrived at, whereupon box F4 effects i-1 downward steps.

According to an embodiment of the invention, the time taken to reach maximum power speed $\omega_{KD}$ calculated by the equation $$T_{max\,power} = T_{shift} + T_{acceleration}$$

where $T_{shift}$ is the time which the gearchange system takes to change from current gear to one of the candidates for the gear which will most quickly lead to the engine reaching maximum power speed $\omega_{KD}$, i.e. a gear from among the various possible gears. This parameter is known to the gearchange system, since it is system-determined. If the time for a zero gearchange is calculated (i.e. no gearchange at all), this term is obviously 0. $T_{acceleration}$ is the time taken to accelerate the vehicle 1 to maximum power speed $\omega_{KD}$ changing gear. $T_{acceleration}$ may be derived as follows.

On the assumption of the relationships in equations (1) to (3)

$$M = J\dot{\omega} \quad (1)$$

$$M = M_e - \frac{F_{res}r}{i} \quad (2)$$

$$J = m + I_e \frac{i^2}{r^2} \quad (3)$$

where M is accelerating torque, J the vehicle's inertia, $\omega$ the engine speed, $M_e$ the torque for the engine's flywheel, $F_{res}$ running resistance, r the wheel radius, i total transmission ratio, m the weight of the vehicle and $I_e$ the engine's moment of inertia; which relationships are expressed by equation (4)

$$\frac{d\omega}{dt} = \dot{\omega} = \frac{M}{J} = \frac{M_e - \frac{F_{res}r}{i}}{m + I_e \frac{i^2}{r^2}} \quad (4)$$

which ultimately means that $$T_{acceleration} = \int_{\omega_1}^{\omega_2} \frac{M_e - \frac{F_{res}r}{i}}{m + I_e \frac{i^2}{r^2}} d\omega \quad (5)$$

it will be seen that the choice of gear takes place in real time by means of the above equations, i.e. each time the kickdown function is initiated. The calculations are preferably done in the control unit when it receives a kickdown indication as described above.

Figure 3:
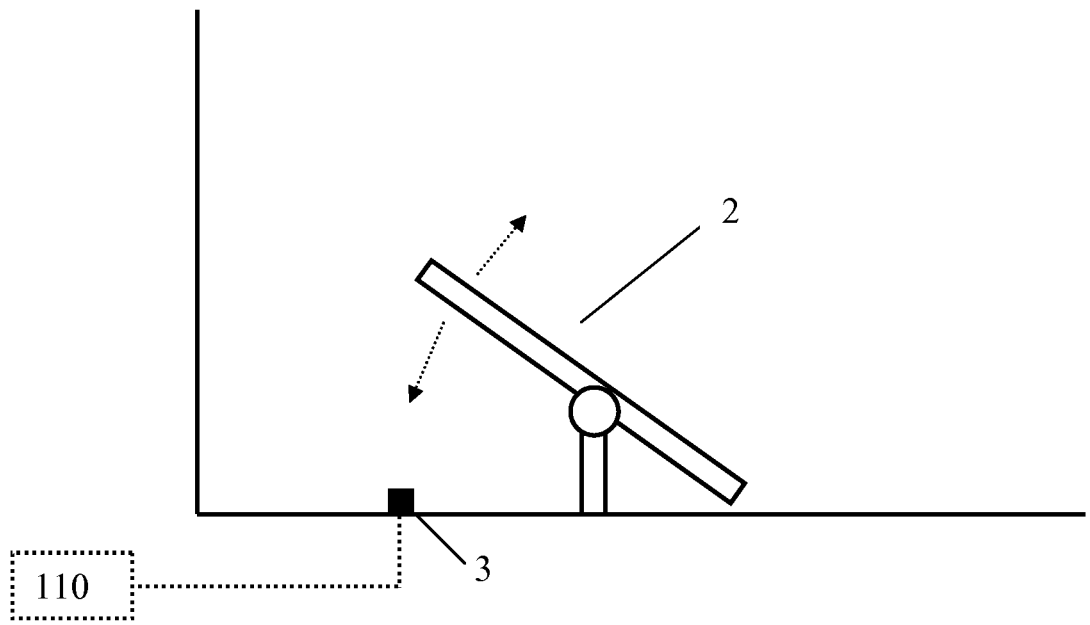
FIG. 3 depicts schematically an accelerator pedal comprising a kickdown function.

According to another embodiment of the invention, the system comprises also a control means 2 adapted to providing an indication if the kickdown function is to be initiated. The control means 2 is preferably an accelerator pedal 2 comprising a kickdown function. As depicted in FIG. 3, the accelerator pedal 2 may adopt a plurality of continuous positions between a first extreme position (corresponding to no acceleration applied) and a second extreme position (corresponding to full acceleration applied). Depressing the accelerator pedal to its second extreme position will activate, for example, a push-button or a sensor 3, leading to the system's kickdown function being initiated. For example, an electrical signal may be sent from the button or the sensor 3 to a control unit 110 for use in controlling the gearbox 20.

The invention relates also to a motor vehicle 1, e.g. a truck or bus, comprising at least one system as above.

The invention relates also to a method for changing gear in a gearbox in a motor vehicle 1. The method comprises responding to receiving an indication by choosing from among various possible gears a gear whereby the engine 10 achieves a desired speed $\omega_{KD}$ in a shorter time than with any other gear from among the various possible gears. The method functions in all essentials according to the flowchart in FIG. 4.

It should also be noted that the method and embodiments of the method above may be modified according to the various embodiments of a system for control of a gearbox according to the invention.

Specialists will also appreciate that a method for changing gear in a gearbox according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (program read-only memory), EPROM (erasable PROM), flash memory, EEPROM (electrically erasable PROM), hard disc unit, etc.

Figure 5:
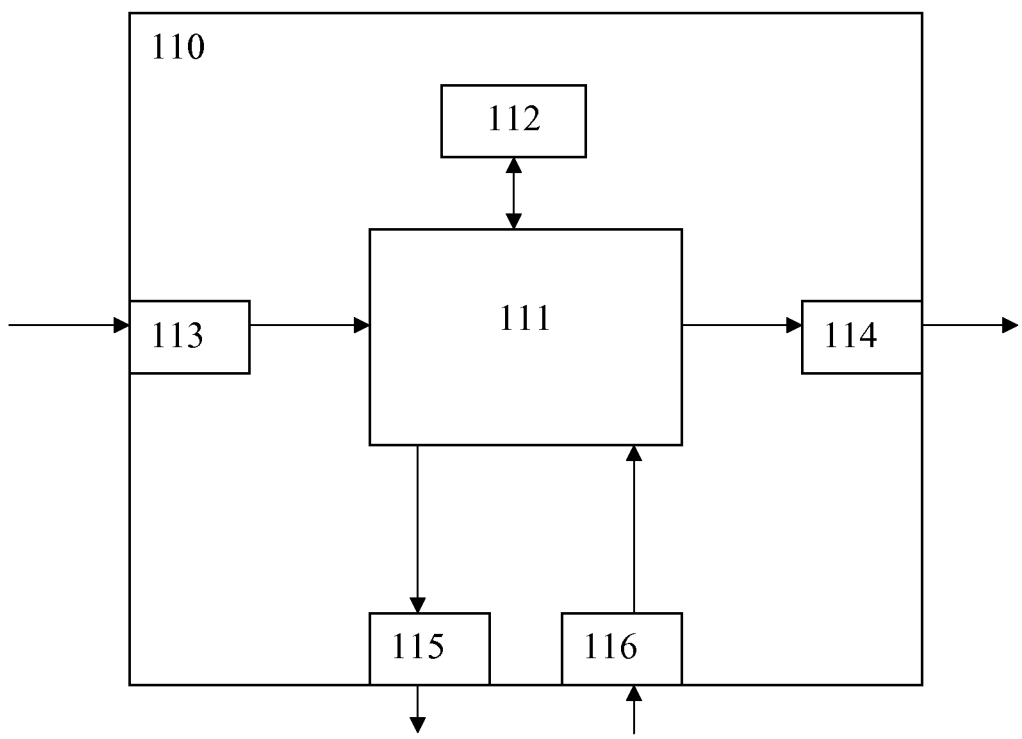
FIG. 5 depicts a control unit forming part of a system according to the invention.

FIG. 5 depicts schematically a control unit 110 forming part of a system according to the invention. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored programme code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals processable by the calculation unit 111. The calculation unit 111 is then provided with these signals. The signal sending devices 114, 115 are adapted to converting signals received from the calculation unit 111 in order to create, eg by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the respective devices for respectively receiving input signals and sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Finally, the present invention is not limited to its embodiments described above, but relates to and comprises all embodiments within the scope of protection of the attached independent claims.

The invention claimed is:

1. A system for controlling gear change of a gearbox of a motor vehicle with an engine connected to drive the gearbox, the gearbox having a plurality of gears, the system comprising:
   at least one control unit configured and operable for controlling the gearbox; and
   the system is configured and operable for responding to receiving an indication by choosing for the gearbox a target gear of the plurality of gears that causes the engine to achieve a desired speed $\omega_{KD}$ in a shorter time than with any gear of the plurality of gears other than the target gear, wherein the target gear minimises a time function $T_{max\ power} = T_{shift} + T_{acceleration}$, where $T_{Shift}$ is the time taken to effect the gear change, and $T_{Acceleration}$ is the time taken to accelerate the vehicle to maximum power speed $+/-\Delta\omega$ after changing gear, where $\Delta\omega$ is an engine speed value of the order of 100-300 rpm.

2. A system according to claim 1, further comprising a control device connected to the system, wherein the control device provides the indication.

3. A system according to claim 2, wherein the control device comprises an accelerator pedal comprising a kickdown function, for thereby producing the indication.

4. A system according to claim 1, wherein the desired engine speed $\omega_{KD}$ is within an engine speed range which comprises the maximum power speed of the engine.

5. A system according to claim 4, wherein the engine speed range is defined as the maximum power speed of the engine $+/-\Delta\omega$.

6. A system according to claim 1, wherein the target gear is the current gear or a lower gear.

7. A system according to claim 1, wherein the target gear is chosen on the basis of calculations in real time.

8. A system according to claim 1, wherein the indication is an electrical control signal.

9. A system according to claim 1, wherein the gearbox is an automatic gearbox or an automated manual gearbox comprising the plurality of gears, and the vehicle comprises one of a truck and a bus.

10. A system according to claim 1, wherein candidate gears for the target gear are a current gear and gears lower than the current gear.

11. A system according to claim 1, wherein the indication is an electrical control signal generated by a kickdown function initiated by a driver.

12. A system according to claim 1, wherein $T_{Acceleration}$ is determined by $$T_{acceleration} = \int_{\omega_1}^{\omega_2} \frac{M_e - \frac{F_{res} r}{i}}{m + I_e \frac{i^2}{r^2}} d\omega$$

where $M_e$ is a torque for the flywheel of the engine, $I_e$ the moment of inertia of the engine and $F_{res}$, r, i and m are respectively a running resistance, a wheel radius, a total transmission ratio and a weight for the vehicle.

13. A motor vehicle comprising at least one system according to claim 1.

14. A computer-readable medium product incorporating a program comprising program code which, when the program code is executed in a computer, causes the computer to effect the method according to claim 13.

15. A method for controlling a gear change in a gearbox in a motor vehicle, wherein the vehicle comprises an engine connected to drive the gearbox, the gearbox having a plurality of gears, the method comprising:

receiving an indication; and responding to the indication by choosing for the gearbox a target gear of the plurality of gears that causes the engine to achieve a desired speed $\omega_{KD}$ in a shorter time than with any gear of the plurality of gears other than the target gear, wherein the target gear minimises a time function $T_{max\ power} = T_{shift} + T_{acceleration}$, where $T_{Shift}$ is the time taken to effect the gear change, and $T_{Acceleration}$ is the time taken to accelerate the vehicle to maximum power speed $+/-\Delta\omega$ after changing gear, where $\Delta\omega$ is an engine speed value of the order of 100-300 rpm.

16. A computer-readable medium program product according to claim 15, wherein the computer-readable medium product comprises at least one of ROM (read-only memory), PROM (programmable ROM), EPROM (erasable PROM), flash memory, EEPROM (electrically erasable PROM) and hard disc unit.

17. A system for controlling gear change of a gearbox of a motor vehicle with an engine connected to drive the gearbox, the gearbox having a plurality of gears, the system comprising:

at least one control unit configured and operable for controlling the gearbox; and the system is configured and operable for responding to receiving an indication by choosing for the gearbox a target gear of the plurality of gears that causes the engine to achieve a desired speed $\omega_{KD}$ in a shorter time than with any gear of the plurality of gears other than the target gear, wherein the desired engine speed $\omega_{KD}$ is within an engine speed range which comprises a maximum power speed of the engine, wherein the engine speed range is defined as the maximum power speed of the engine $+/-\Delta\omega$, where $\Delta\omega$ is an engine speed value of the order of 100-300 rpm.

* * * * *